United States Patent [19]
Lin et al.

[11] Patent Number: 5,633,765
[45] Date of Patent: May 27, 1997

[54] ADAPTIVE POLE-ZERO CANCELLATION FOR WIDE BANDWIDTH MAGNETORESISTIVE PRE-AMPLIFIER

[75] Inventors: Kingston Lin, Morgan Hill; Bac V. Pham, San Jose, both of Calif.

[73] Assignee: Samsung Electronics, Ltd., Suwon, Rep. of Korea

[21] Appl. No.: 545,417

[22] Filed: Oct. 19, 1995

[51] Int. Cl.$^6$ .................... G11B 5/09; G11B 5/02
[52] U.S. Cl. .................... 360/46; 360/67
[58] Field of Search .................... 360/46, 67, 65

[56] References Cited

U.S. PATENT DOCUMENTS

| | | |
|---|---|---|
| 5,122,915 | 6/1992 | Klein et al. |
| 5,309,295 | 5/1994 | Bailey et al. |
| 5,327,303 | 7/1994 | Smith . |
| 5,426,542 | 6/1995 | Smith . |
| 5,430,592 | 7/1995 | Yoda . |

OTHER PUBLICATIONS

Wakimoto et al., "A Low-Power Wide-Band Amplifier Using a New Parasitic Capacitance Compensation Technique," *IEEE Journal of Solid-State Circuits*, 25:200–206, (Feb., 1990).

Klaassen et al., "Read/Write Amplifier Design Considerations for MR Heads," *IEEE Transactions on Magnetics*, 31:1056–1061 (Mar., 1995).

*Primary Examiner*—W. C. Kim
*Attorney, Agent, or Firm*—Blakely, Sokoloff, Taylor & Zafman LLP

[57] ABSTRACT

An apparatus for the adaptive cancellation of at least a first pole frequency in a magnetoresistive (MR) head device includes a preamplifier coupled to first and second terminals of the MR head. A signal at a pole frequency produced by the preamplifier is cancelled by a zero boost frequency signal generated as a result of a signal across the MR head read by a differential amplifier. The zero boost frequency signal is passed to the read channel coming from the MR head to cancel the pole.

12 Claims, 5 Drawing Sheets

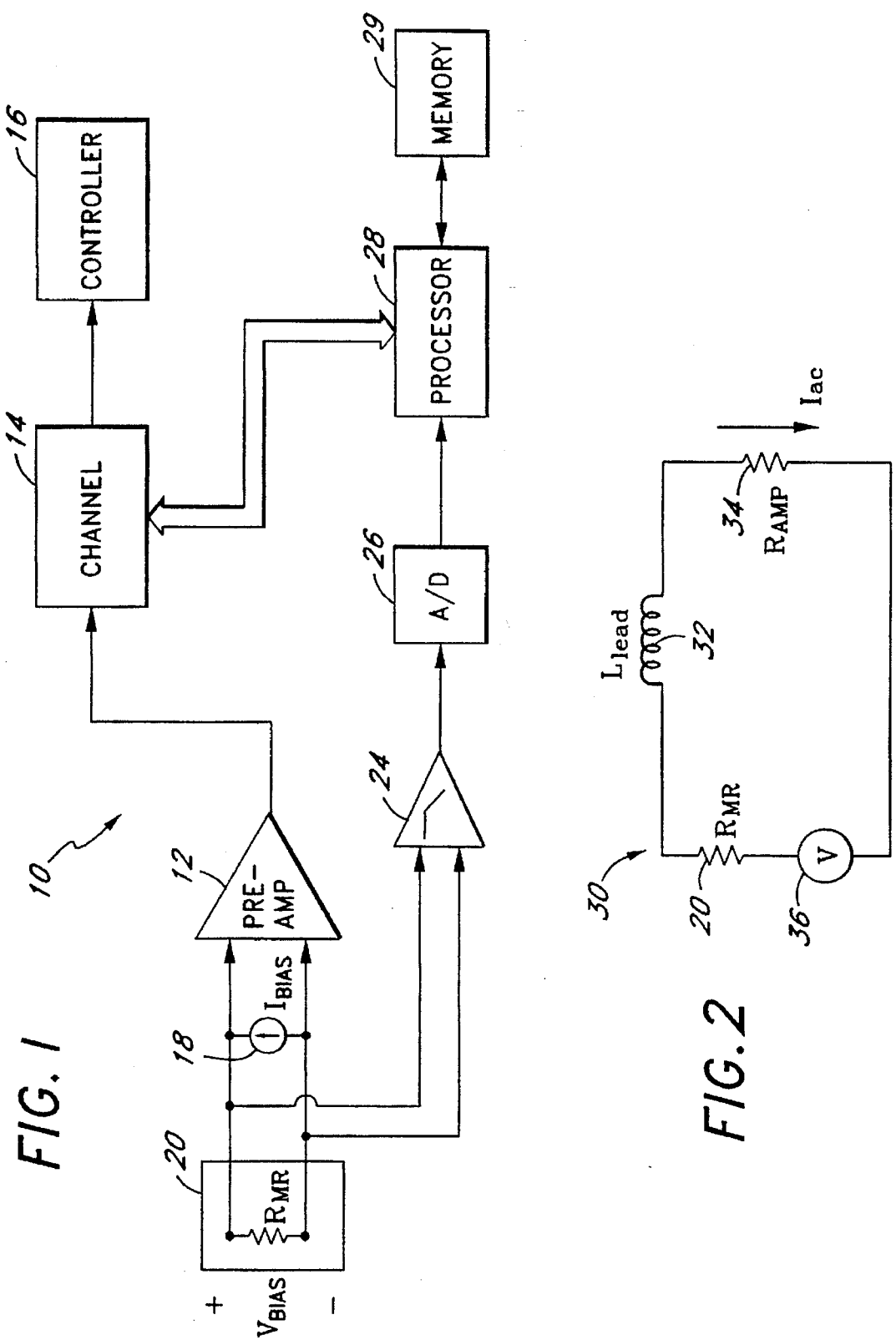

5,633,765

ADAPTIVE POLE-ZERO CANCELLATION FOR WIDE BANDWIDTH MAGNETORESISTIVE PRE-AMPLIFIER

BACKGROUND OF THE INVENTION

The present invention generally relates to magnetic storage systems. More particularly, the present invention relates to storage devices which employ magnetoresistive heads.

The trend in the data storage industry is to continually increase the data rate at which information is read from magnetic storage surfaces such as disk drives. Designers are developing high performance disk drives which tend to have magnetic domains positioned close together on the magnetic storage media, creating a high density of data recording. Additionally, these drives have greater rotation rates than lower performance drives, resulting in higher data rates. Higher data rates require faster voltage transitions at the input to the channel circuitry used to read data from the disk surface. Faster voltage transitions produce higher frequency components in the voltage input signal, thereby requiring a greater bandwidth from the channel circuitry.

Until recently, designers primarily used inductive heads to read data from these disk surfaces. Unfortunately, inductive heads are limited in the bandwidth at which they may function. Designers, accordingly, developed magnetoresistive (MR) heads which do not have the large inductance associated with previous heads. These MR heads, therefore, can accommodate higher data rates. Data is read from a disk surface by monitoring the changing resistivity of the MR head. The resistance of MR heads is a function of the strength of the magnetic field to which it is exposed. Since the resistance of the head varies with magnetic flux, the current through, or the voltage across the head is a function of the data written on the magnetic media.

This approach to reading information from the surface of a disk drive has proven to be very successful. However, as higher performance storage systems are developed, there is a continuing demand for greater bandwidth from the head and the read circuitry associated with the head. The ability to attain greater bandwidths is currently limited by the response of the MR head and the preamplifier used to generate read signals.

Several different preamplifier configurations are used in conjunction with MR heads. In general, these configurations differ in the manner by which they bias the head and in their approach to sensing changes in head resistance. A common configuration is a "current bias current sense" (CBCS) preamplifier, which biases the MR head with a constant current and senses changes in the resistance of the head by reading the signal variations in the current through the MR head. Other MR heads are implemented using current bias voltage sense (CBVS), voltage bias current sense (VBCS), and voltage bias voltage sense (VBVS) architectures to measure changes in head resistance. It is known that the CBCS configuration has a simple single pole response while the other configurations are more complex second order systems having multiple poles. These second order systems have slightly wider bandwidths than the single pole CBCS configuration. However, none of these existing architectures provide sufficient bandwidth to satisfy the ever-increasing demands of high performance storage systems. There is a need for a MR head and preamplifier implementation which has an increased bandwidth response.

A substantial portion of the bandwidth of signals produced by existing MR heads and preamplifiers is unusable because of pole frequencies created by factors such as the resistance of the head and the head lead and flex inductance. These pole frequencies impair the overall bandwidth of the preamplifier. One approach to recovering this lost bandwidth is to place several capacitors in the preamplifier to approximate the pole caused by the head resistance and the flex and head lead inductance. By using these capacitors, a general approximation of a zero can be generated which cancels the pole thereby extending the bandwidth of the preamplifier. This approach, however, is unsatisfactory for several reasons. First, because the capacitance selected is only an approximation of the value needed to cancel the pole, the pole is never completely cancelled. This can cause either a lower bandwidth or peaking in the frequency spectrum. Further, the addition of a zero to the preamplifier can result in feedback oscillation problems due to stray capacitance. These preamplifiers typically have high gains, making them susceptible to feedback oscillation. Another drawback of this approach is that it does not permit adaptive cancellation of poles. The poles of a typical MR head system vary as the magnetoresistivity of the head varies.

Accordingly, an approach to more accurately cancel pole frequencies is needed. Preferably, the approach should be implemented in a manner which permits adaptive (on a per-head basis) cancellation of pole frequencies to attain a wide bandwidth while maintaining a linear group delay. Little or no stray capacitance should be added to the preamplifier. Further, the approach should utilize existing read channel components to minimize or eliminate the need for additional circuitry.

SUMMARY OF THE INVENTION

According to the invention, an apparatus for the adaptive cancellation of at least a first pole frequency in a magnetoresistive (MR) head device includes a preamplifier coupled to first and second terminals of the MR head. A signal at a pole frequency produced by the preamplifier is cancelled by a zero boost frequency signal generated as a result of a signal across the MR head read by a differential amplifier. The zero boost frequency signal is passed to the read channel coming from the MR head to cancel the pole. In one embodiment, the zero boost frequency is generated using an inductance value and a resistance value stored in a memory of a processor. These values represent the inductance of the MR head leads and the resistance of the preamplifier.

Embodiments of the present invention permit the adaptive cancellation of pole frequencies in the signal generated by preamplifiers coupled to MR heads. This increases the bandwidth significantly, permitting the use of existing heads and preamplifiers in systems with very high data rates. The system is readily implemented using existing channel components. Further, because the pole frequency is cancelled in the channel, no stray capacitance is added to the preamplifier.

For a fuller understanding of the nature and advantages of the invention, reference should be made to the ensuing description taken in conjunction with the accompanying drawings.

BRIEF DESCRIPTION OF THE DRAWINGS

FIG. 1 is a block diagram depicting a disk drive head and read channel incorporating features of the present invention;

FIG. 2 is a simplified input model of the CBCS MR head and preamplifier of FIG. 1;

DESCRIPTION OF SPECIFIC EMBODIMENTS

Figure 3A:
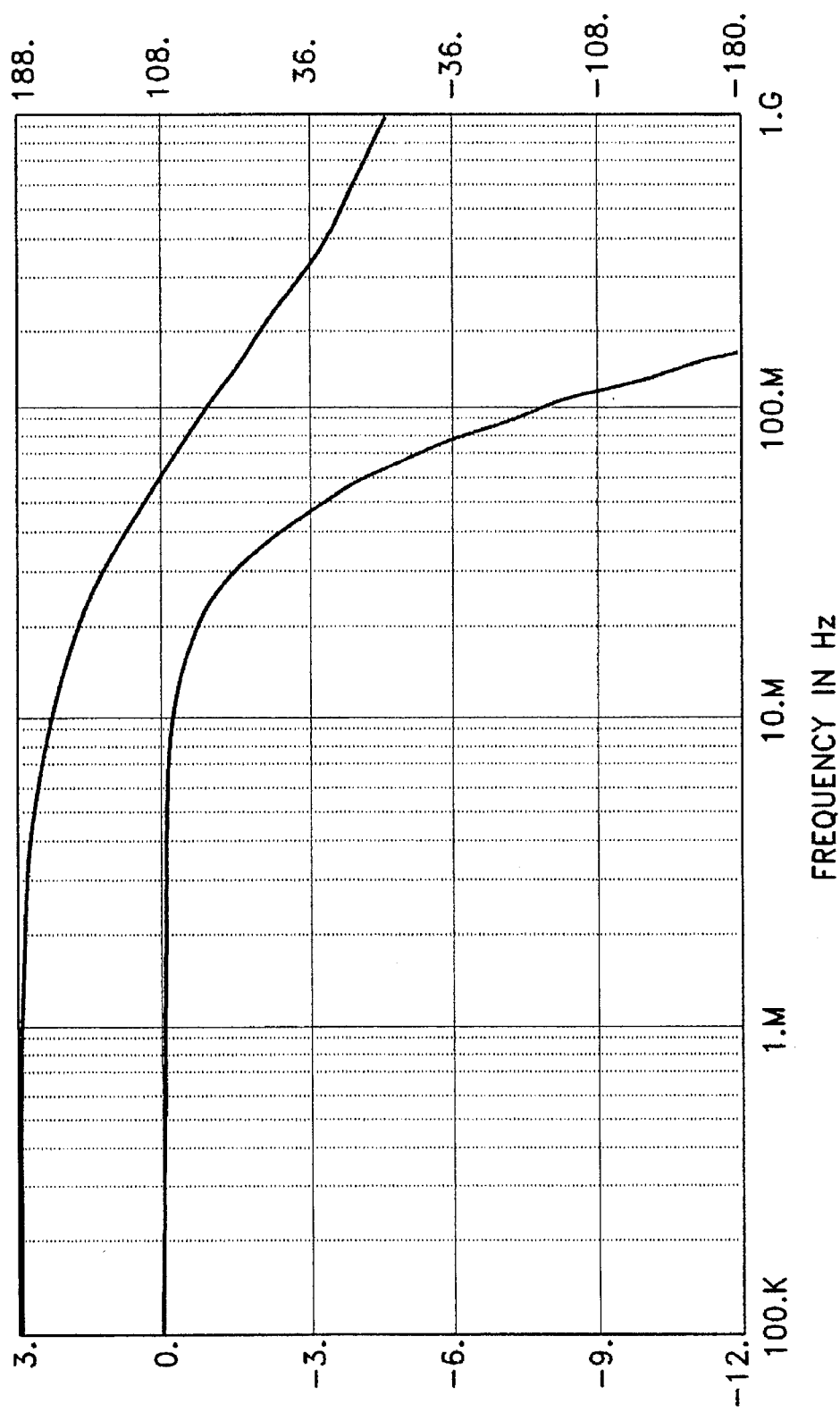
FIGS. 3A and 3B are diagrams depicting the response of a CBCS MR head and preamplifier without the compensation features of the present invention.

Referring now to FIG. 1, one specific embodiment of a system 10 implementing the adaptive compensation features of the present invention is shown. In this specific embodiment, a preamplifier 12 is coupled to receive inputs from a MR head 20. The head 20 has a resistance $R_{MR}$ associated with it. This resistance varies as a result of changes in the magnetic flux of the magnetic media positioned proximate the head 20. Current source 18 serves to bias the preamplifier 12. A constant current $I_{BIAS}$ (typically on the order of 10 mA) is provided from the current source 18. This constant current, in conjunction with the changing resistance $\Delta R_{MR}$ of the MR head, results in a voltage $\Delta V$ proportional to the resistivity of the head. Preamplifier 12, in one specific embodiment, senses the signal current through the MR sensor. The preamplifier 12 may be a current preamplifier with a low input impedance and virtually shorted inputs. An amplified signal proportional to the resistivity of the MR head is input to the channel 14. Channel 14 provides data to a servo signal processor 28 and to a controller 16.

Disk systems typically include a plurality of magnetic disks that rotate about a common axis. A number of MR heads and their associated preamplifiers are positioned proximate the surfaces of these disks using one or more actuator arms. The actuator arms are positioned by the controller 16 using information received from the channel 14 and the servo processor 28. The preamplifier 12 for each MR head is positioned as closely as possible to the head to minimize the length of the leads or wires used to connect the preamplifier 12 to the head 20. Minimizing the lead lengths tends to reduce the inductance associated with the lead; however, there is typically some inductance associated with these leads. This inductance will be termed $L_{IN}$. The value of $L_{IN}$ is generally known, e.g., by measurement at the factory or by using a known wire size and length. The inductance $L_{IN}$ contributes to pole frequencies which tend to erode the useful bandwidth of the system.

CBCS-type MR preamplifiers have a single pole. The elements contributing to this pole are shown in FIG. 2 where a simplified input model 30 of a CBCS MR preamplifier is shown. The bandwidth response of this preamplifier is a function of the resistivity of the head ($R_{MR}$), the inductance associated with the head leads ($L_{IN}$), and a small resistance associated with the amplifier ($R_{AMP}$). The pole (−3 dB roll-off) frequency is determined as follows: $f_{-3dB} c[R_{MR}+R_{AMP}]/[2*PI*L_{IN}]$.

This single pole frequency, in one specific embodiment of the present invention, is calculated during operation of the head. A zero, corresponding to the calculated pole, is then generated to cancel the pole, thereby extending the bandwidth of the system. Referring again to FIG. 1, the pole frequency may be calculated by, e.g., a servo processor 28 or other processor coupled to the channel 14. Once the pole frequency is calculated by the processor 28, the zero (having the same frequency) is calculated and input to the channel 14. The pole frequency is calculated as follows. As mentioned above, the head lead inductance $L_{IN}$ of the MR head 20 is, generally, a known factor. Thus, $L_{IN}$ is stored in the processor 28 as a constant value. The resistance associated with the preamplifier ($R_{AMP}$) is also a generally known value. $R_{AMP}$ is also stored in the processor 28 as a constant value. Provision may be made for updating the values of $R_{AMP}$ and $L_{IN}$ as needed. The remaining contribution to the pole frequency is the resistance $R_{MR}$ of the head, which varies as the magnetic flux of the disk varies. The value of $R_{MR}$ is measured and provided to the processor 28 as a variable during operation of the head. The processor is then able to calculate the pole frequency and generate a zero, thereby extending the effective bandwidth of the MR preamplifier.

The value of $R_{MR}$ is measured as follows. When a constant current $I_{BIAS}$ is used, a voltage $V_{BIAS}$ varies in proportion to $R_{MR}$. A DC component of $V_{BIAS}$ is measured using a differential to single-ended amplifier 24 and is input to a conventional analog to digital (A/D) converter 26 for input as a digital signal to the processor 28. That is, a digital signal indicative of the magnitude of $V_{BIAS}$ is input to processor 28. The processor calculates a value of $R_{MR}$ using this input voltage value and the stored value for the bias current using Ohm's law ($R_{MR}=V_{BIAS}/I_{BIAS}$).

The processor 28 then calculates a pole frequency for a given value of $R_{MR}$, $R_{AMP}$ and $L_{IN}$. This value of pole frequency can be used to select a zero boost frequency to accurately cancel the pole. The calculated zero boost frequency is input to read channel 14 where it may be stored, e.g., in a register or registers dedicated for this purpose. The zero is combined with the signal from the preamplifier 12 in the channel to produce a signal with an increased bandwidth.

Figure 3B:
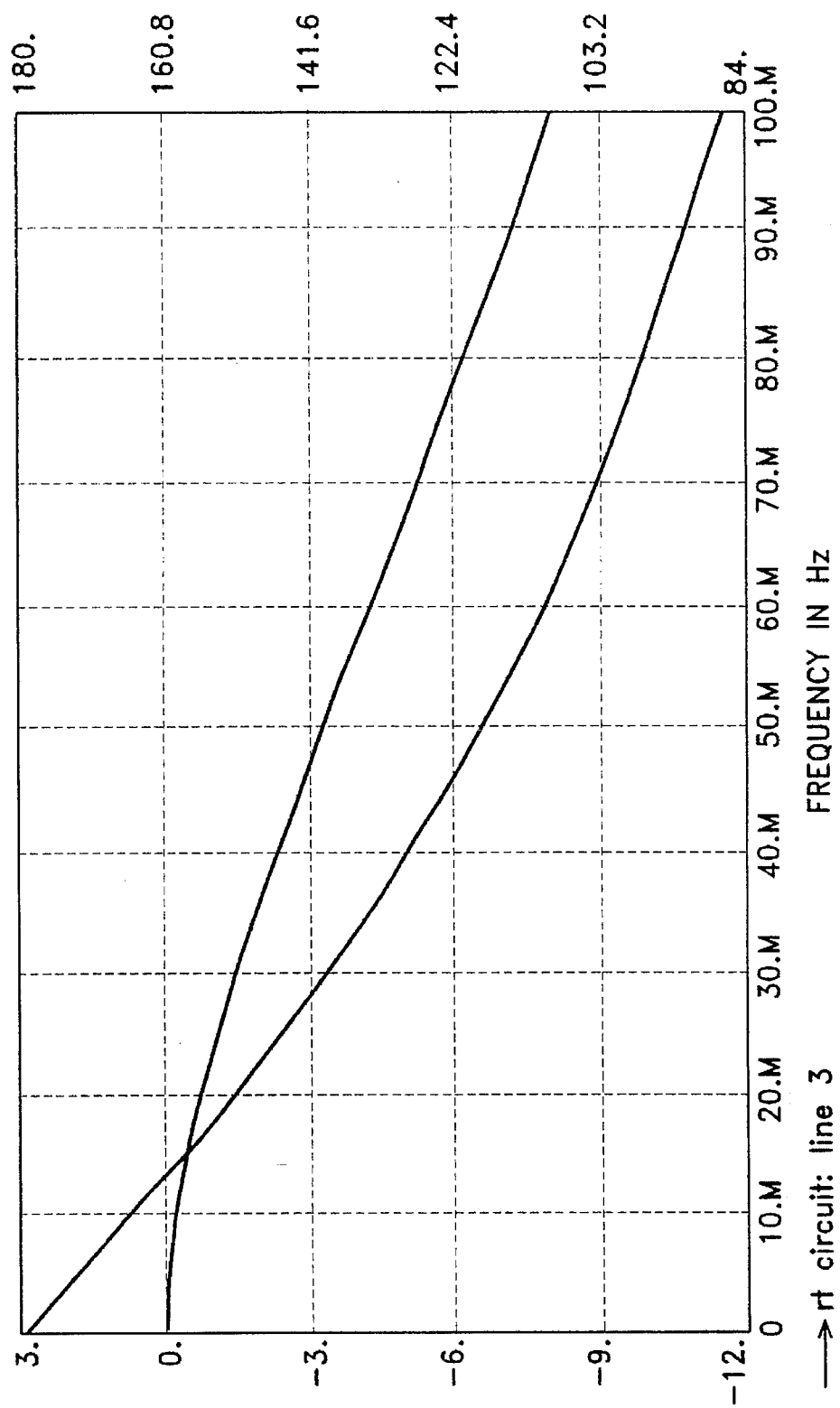
Figure 4A:
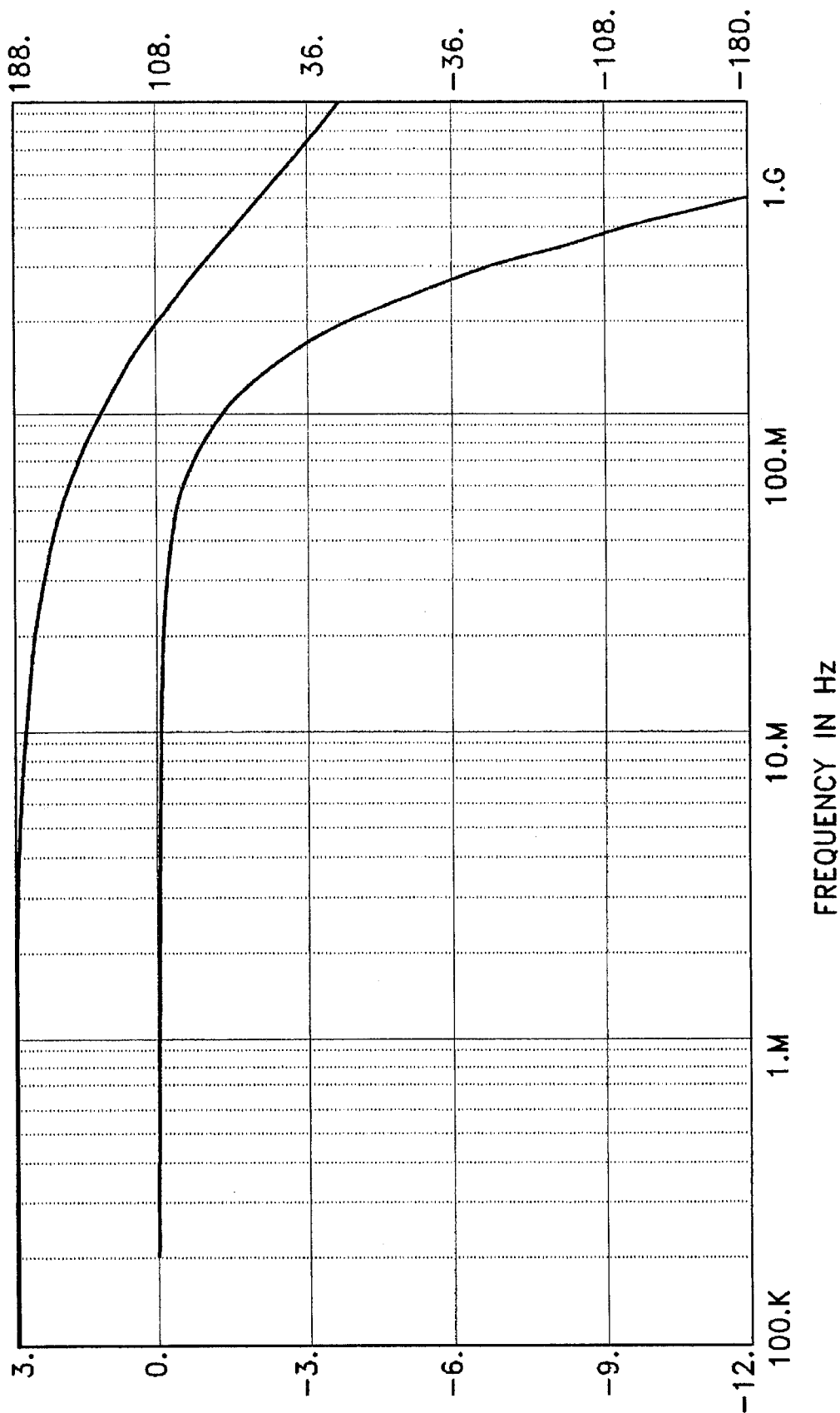
FIGS. 4A and 4B are diagrams depicting the response of a CBCS MR head and preamplifier using the compensation features of the present invention.
Figure 4B:
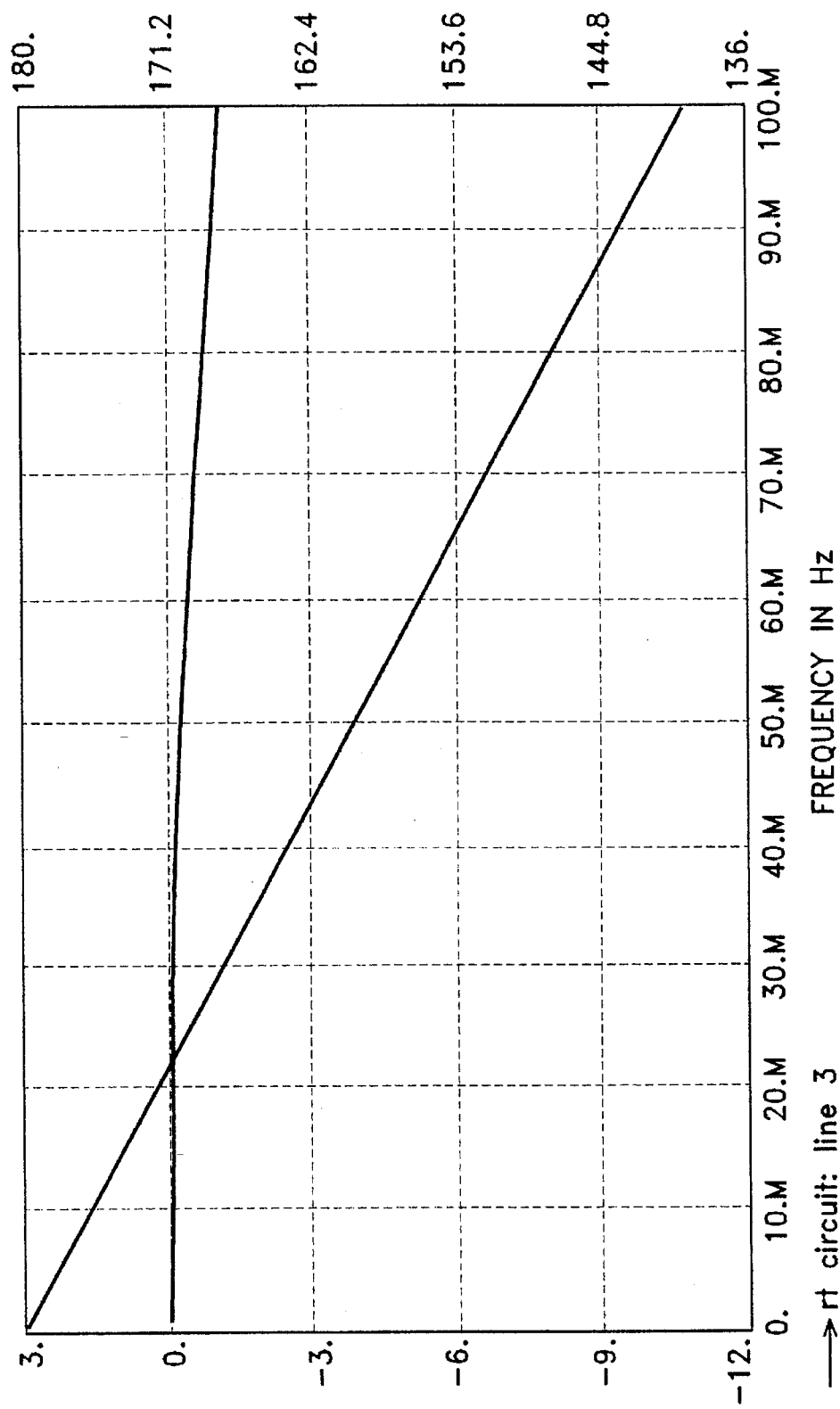

FIGS. 3–4 are frequency plots depicting responses of a system which does not compensate for poles generated by lead inductance (FIG. 3) and the system 10 of FIG. 1 which compensates for poles using concepts of the present invention (FIG. 4). In FIG. 4, a significant amount of useable bandwidth is gained by cancelling a pole at 46 MHz. Cancellation of this pole secures a significant amount of additional bandwidth. Here, the entire bandwidth of the preamplifier, or 180 MHz, is useable. As preamplifier designs advance, greater bandwidth gains may be possible. The pole frequency in this specific example is based upon a flex inductance of the MR head leads ($L_{IN}$) equal to 100 nH, a resistance $R_{MR}$ of the head of 26 ohms, and a resistance $R_{AMP}$ of the amplifier equal to 3 ohms. Poles generated by different inductance and resistance values are also cancelled using techniques of the present invention.

The net result is an ability to adaptively recover useable bandwidth which is otherwise eroded by factors such as lead inductance and head resistance. The approach of the present invention is readily implemented using conventional circuitry available in typical disk drive systems, and provides a wide bandwidth response with a linear group delay. Little or no stray capacitance is added to the preamplifier. Because the compensation features are implemented on a channel which is typically on a separate chip from the preamplifier, there is no feedback oscillation added as in previous compensation techniques. Features of the present invention may be used to enhance the capabilities of existing read channels.

As will be appreciated by those familiar with the art, the present invention may be embodied in other specific forms without departing from the spirit or essential characteristics thereof. For example, while use of a servo processor has been described to perform the calculations needed to cancel a pole frequency, those skilled in the art will recognize that any available processor or controller in the read channel may be used. Processing capability available on the channel may also be used. Further, while one preferred embodiment has been described for use with a CBCS-type MR preamplifier, the teachings of the present invention may be implemented with other MR preamplifier architectures.

Accordingly, the disclosure of the invention is intended to be illustrative, but not limiting, of the scope of the invention which is set forth in the following claims.

What is claimed is:

1. An apparatus for the adaptive cancellation of at least a first pole frequency in a magnetoresistive (MR) head device, the apparatus comprising:

a preamplifier coupled to first and second terminals of said MR head, said preamplifier producing a first signal having said at least first pole frequency;

a differential amplifier coupled to said first and second terminals of said MR head, said differential amplifier producing a second signal indicative of a voltage across said MR head;

a processor, coupled to receive said second signal, for generating at least a first zero boost frequency using said second signal; and a channel device, coupled to said preamplifier and to said processor, said channel device cancelling said at least first pole frequency using said at least first zero boost frequency.

2. The apparatus of claim 1 further comprising a memory, coupled to said processor, for storing an inductance value of said MR head and a resistance value of said preamplifier, wherein said inductance and resistance values are used by said processor to generate said at least first zero boost frequency.

3. The apparatus of claim 1 wherein said MR head is biased by a constant current and wherein said preamplifier senses the current through said MR head.

4. The apparatus of claim 1 wherein said processor is a servo processor.

5. A method for the adaptive cancellation of a pole frequency of a signal generated by a magnetoresistive (MR) head and preamplifier system, the method comprising the steps of:

(1) storing a first value indicative of the inductance of said MR head and a second value indicative of the resistance of said preamplifier in a memory;

(2) measuring the resistance of said MR head;

(3) passing a third value indicative of said measured resistance of said MR head to a processor coupled to said memory;

(4) calculating a zero boost frequency in said processor using said first, second and third values; and (5) cancelling said pole frequency of said signal produced by said MR head and preamplifier using said zero boost frequency.

6. The method of claim 5, wherein said step (5) of cancelling said pole frequency is accomplished in a read channel device coupled to said preamplifier and to said processor.

7. The method of claim 5 wherein said steps (2)–(5) are repeated as said resistance of said MR head varies.

8. The method of claim 5 wherein said MR head is biased with a constant current and wherein said preamplifier senses the current across said MR head to produce said signal having said pole frequency.

9. An apparatus for improving the bandwidth of magnetoresistive (MR) head read circuitry, the apparatus comprising:

a MR head having first and second terminals;

a preamplifier coupled to said first and second terminals of said MR head for producing a first signal having an at least first pole frequency;

detection circuitry, coupled to said first and second terminals of said MR head, for generating a second signal indicative of a voltage across said MR head;

a processor, coupled to said detection circuitry, for receiving said second signal and for generating a third signal representative of at least a first zero boost frequency associated with said second signal;

a read channel circuitry, coupled to said preamplifier to receive said first signal and to said processor to receive said third signal, said read channel circuitry combining said first and third signals to cancel said at least first pole frequency of said first signal.

10. The apparatus of claim 9 wherein said detection circuitry includes a differential amplifier.

11. The apparatus of claim 9 wherein said preamplifier is a current bias, current sense preamplifier configuration.

12. The apparatus of claim 9 further comprising a storage device, coupled to said processor, for storing constant values used by said processor to calculate said at least first zero boost frequency.

* * * * *